(12) United States Patent
Yan

(10) Patent No.: US 10,255,093 B2
(45) Date of Patent: Apr. 9, 2019

(54) TECHNIQUES FOR PORTABLE COMPUTING DEVICE VIRTUALIZATION

(71) Applicant: INTEL CORPORATION, Santa Clara, CA (US)

(72) Inventor: Shoumeng Yan, Beijing (CN)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/026,860

(22) PCT Filed: Dec. 17, 2013

(86) PCT No.: PCT/CN2013/089668
§ 371 (c)(1),
(2) Date: Apr. 1, 2016

(87) PCT Pub. No.: WO2015/089730
PCT Pub. Date: Jun. 25, 2015

(65) Prior Publication Data
US 2016/0239334 A1  Aug. 18, 2016

(51) Int. Cl.
*G06F 9/455* (2018.01)
*G06F 9/52* (2006.01)
(Continued)

(52) U.S. Cl.
CPC .......... *G06F 9/45558* (2013.01); *G06F 9/466* (2013.01); *G06F 9/50* (2013.01);
(Continued)

(58) Field of Classification Search
CPC ........ G06F 9/45558; G06F 9/50; G06F 9/466; G06F 9/52; G06F 11/323;
(Continued)

(56) References Cited

U.S. PATENT DOCUMENTS 7,774,781 B2 * 8/2010 Dees ..................... G06F 9/4443
710/40
9,164,803 B2 * 10/2015 Kishan .................. G06F 9/5011
(Continued)

FOREIGN PATENT DOCUMENTS

CN      102725734 A    10/2012
CN      103365702 A    10/2013

OTHER PUBLICATIONS

"GetForegroundWindow function" [online], Feb. 16, 2013, [retrieved on Aug. 31, 2017], Retrieved from the internet <URL: https://msdn.micorsoft.com/de-de/library/windows/desktop/ms633505(v=vs.85).aspx>.*

(Continued)

*Primary Examiner* — Bing Zhao
*Assistant Examiner* — Michael W Ayers

(57) ABSTRACT

Various embodiments are generally directed to providing virtualization using relatively minimal processing and storage resources to enable concurrent isolated execution of multiple application routines in which one of the application routines is made visible at a time. An apparatus to virtualize an operating system includes a processor component, a visibility checker for execution by the processor component to make a visibility check call to a kernel routine to request an indication of whether an instance of a framework routine that comprises the visibility checker is visible, and resource access code of the instance for execution by the processor component to perform a resource access operation to access a hardware component based on the indication and on receipt of an application programming interface (API) call from an application routine that specifies an API function to access the hardware component. Other embodiments are described and claimed.

25 Claims, 11 Drawing Sheets

(51) Int. Cl.
*G06F 9/46* (2006.01)
*G06F 9/50* (2006.01)
*G06F 11/32* (2006.01)

(52) U.S. Cl.
CPC .............. *G06F 9/52* (2013.01); *G06F 11/323* (2013.01); *G06F 2009/45562* (2013.01); *G06F 2009/45579* (2013.01); *G06F 2009/45587* (2013.01); *G06F 2009/45591* (2013.01)

(58) Field of Classification Search
CPC . G06F 2009/45591; G06F 2009/45562; G06F 2009/45579; G06F 2009/45587
See application file for complete search history.

(56) References Cited

U.S. PATENT DOCUMENTS

| | | | |
|---|---|---|---|
| 2007/0038763 A1* | 2/2007 | Oestvall | G06F 1/3203 709/229 |
| 2007/0266123 A1* | 11/2007 | Johannesson | H04L 12/2812 709/220 |
| 2010/0131956 A1* | 5/2010 | Drepper | G06F 9/5011 718/104 |
| 2012/0311578 A1* | 12/2012 | Hara | G06F 9/45558 718/1 |
| 2013/0132946 A1 | 5/2013 | Ma | |
| 2013/0185720 A1 | 7/2013 | Tuch et al. | |
| 2014/0366040 A1* | 12/2014 | Parker | G06F 9/542 719/318 |

OTHER PUBLICATIONS

Lee, S.M., et al., "A Multi-Layer Mandatory Access Control Mechanism for Mobile Devices Based on Virtualization", Jan. 12, 2008, 5th IEEE CCNN 2008 Proceedings, pp. 251-256.

International Search Report dated Aug. 26, 2014 in International Patent Application No. PCT/CN2013/089668.

* cited by examiner

TECHNIQUES FOR PORTABLE COMPUTING DEVICE VIRTUALIZATION

TECHNICAL FIELD

Embodiments described herein generally relate to providing virtualization to isolate the execution of application routines using relatively minimal resources of a portable computing device.

BACKGROUND

Portable computing devices have increasingly supplanted stationary computing devices (e.g., so-called "desktop" computers) for both personal and business-related uses. The manner in which portable computing devices such as handheld or tablet computing devices are used has therefore increasingly taken on the multiple role and multiple user nature that has been commonplace for some time with stationary computing devices.

As a result, there has been increasing impetus to bring such features as virtualization, which is often used in stationary computing devices, to portable computing devices to maintain separate user environments, enforce parental control, and/or provide a degree of security as multiple applications are executed concurrently. Many of the approaches to providing virtualization taken in stationary computing devices entail greater utilization of processor and/or storage resources than can often be accommodated in portable devices. As familiar to those skilled in the art, the designs of portable devices typically represent a tradeoff between the competing requirements of processing and storage resources, smaller physical size and weight, reduced power consumption, etc. Thus, significant increases in processor and/or storage resources are often prohibitively difficult to accommodate.

Other approaches to virtualization have been devised that do not entail as great a utilization of processor and/or storage resources such that they may be more appropriate for portable computing devices, but these other approaches invariably require extensive modifications to device drivers and other hardware-specific routines to support the numerous input/output features often incorporated into portable computing devices. As familiar to those skilled in the art, device drivers and other routines that engage in more direct interaction with hardware components require greater skill to write and modify than other routines. Further, the code of device drivers and other such hardware-centric routines usually cannot be reused or "ported" between different models of portable computing devices, as it is quite common for different models even with a common product line to implement input/output features with different hardware components.

DETAILED DESCRIPTION

Figure 1:
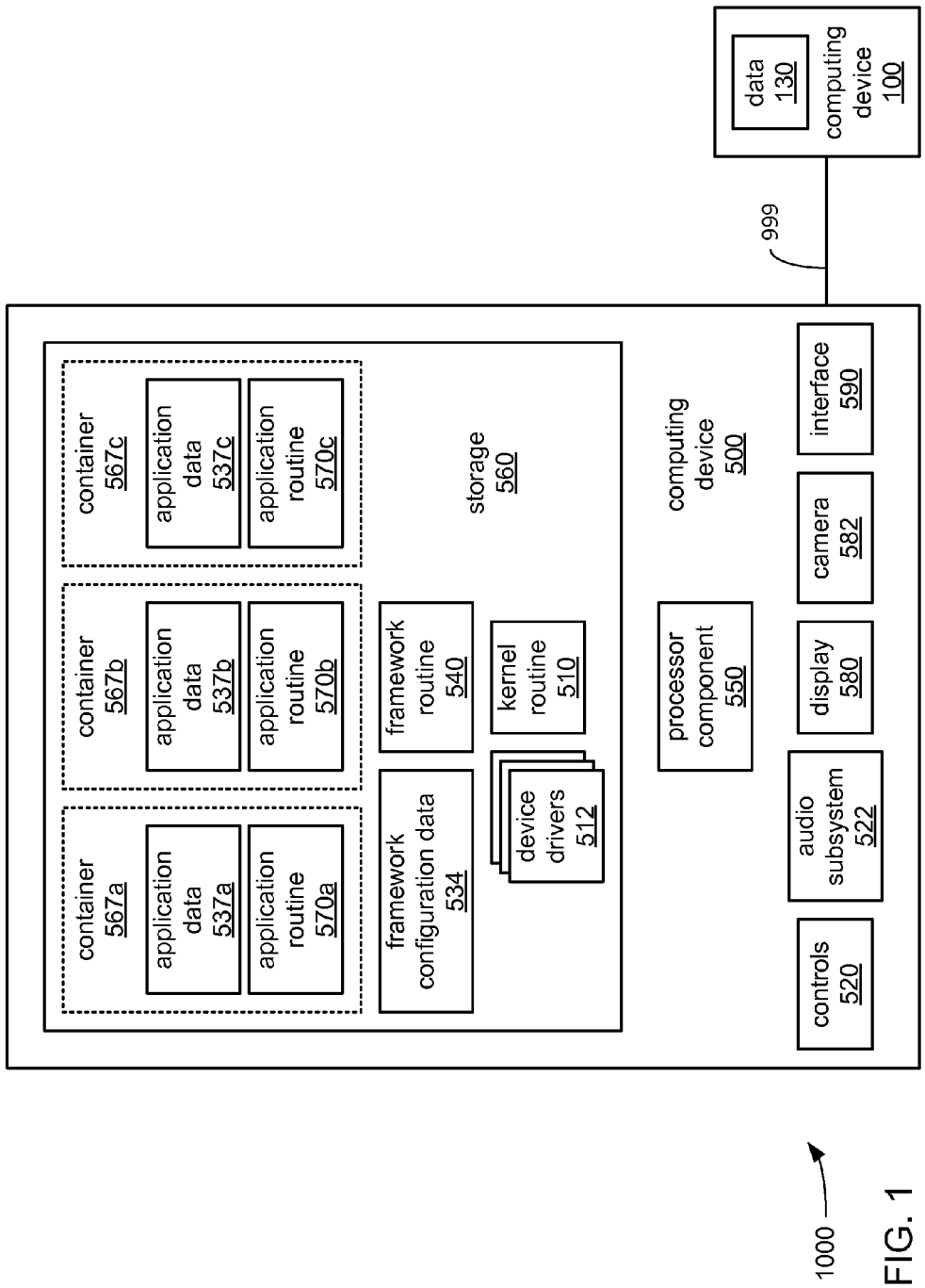
FIG. 1 illustrates an embodiment of a virtualization system.

Various embodiments are generally directed to providing virtualization using relatively minimal processing and storage resources to enable concurrent isolated execution of multiple application routines in which one of the application routines is made visible at a time. More specifically, multiple instances of a framework routine are provided, each defining an isolated memory space and an application programming interface (API) to support the isolated execution of a separate application routine, and each configured to selectively share one or more resources of a computing device. Each of the multiple instances of the framework routine provides a layer of abstraction for its respective application routine from a kernel routine and various device drivers that execute at a lower level of a computing device than the application routines and their corresponding instances of the framework routine.

The application routines need not be specifically modified or designed to support such concurrent execution or to selectively share of resources as a result of each instance of the framework routine responding to API calls from its associated application routine in a manner consistent with that application routine being the only one that is executed. Most, if not all, device drivers also need not be so specifically modified or designed. Instead, it is the framework routine that is subject to the majority of such specific modification or design, and a minimal amount of such specific modification or design may be required of the kernel routine. The modifications to the framework and kernel routines add support for a system call as part of a handshake that takes place between the instances of the framework routine and the kernel routine by which each instance of the framework routine recurringly requests to be informed as to whether it is visible or not visible (e.g., "invisible").

More specifically, before an instance of the framework routine performs a resource access operation to make use of a resource on behalf of its associated application routine, the framework routine makes a visibility check call to the kernel inquiring as to whether that instance of the framework routine is currently the single "visible" instance. Where the kernel routine responds with an indication in the affirmative, the framework routine proceeds with performing the resource access operation on behalf of its associated application routine. However, where the kernel routine responds with an indication in the negative, the framework routine may refrain from performing the resource access operation on behalf of its associated application routine and may behave towards its associated application routine as if that resource access operation was performed.

The distinction between which instance of the framework routine is visible versus which one or more of the other instances are invisible may correlate to which one of the instances is selected to be allowed to perform resource access operations to the kernel routine to interact with console input/output (I/O) devices such as a display, keyboard, pointing device, touchscreen, etc. In some embodiments, only one of the instances of the framework routine may be selected to be visually presented on a display and to receive input from an input device such as a keyboard or touch-sensitive device. In other words, console I/O devices such as a display, keyboard or pointing device are not shared among multiple instances. This limitation of only one of the instances being made visible at a time may be deemed desirable as a result of the typically small size of the displays incorporated into portable computing devices.

The resources to be selectively shared may be hardware components of a computing device that executes the instances of the framework routine and the kernel routine. More specifically, the resources may include one or more of console input/output (I/O) devices (e.g., a display, a keyboard, a pointing device, etc.), interfaces to networks, storage components (e.g., a detachable solid state storage device, an optical disk media device, etc.), and an audio subsystem (e.g., one or more audio digital signal processors, microphones, speakers, etc.). The resource access operations performed by the instances of the framework routine may include system calls to the kernel routine to access a resource indirectly through the kernel routine, which may also entail an access through a device driver. Alternatively or additionally, the resource access operations may include direct read and/or write accesses to ports, buffers, etc. in I/O and/or memory address spaces, thus bypassing the kernel routine and any device drivers.

In some embodiments, the actions taken when the kernel routine responds to the visibility check call with an indication of an instance of the framework routine not being the visible instance may be separately configurable for each instance of the framework routine. By way of example, each instance may be configured to either perform or refrain from performing resource access operations based on configuration information provided to each of the instances of the framework routine as it is instantiated. More precisely, resource access operations associated with particular resources (e.g., hardware components) may be individually configured to either be performed or not performed in a manner that enables control over which resources are caused to be shared among multiple instances of the framework routine that may not be visible.

Other actions taken when the kernel routine responds to the visibility check call with an indication of an instance of the framework routine not being the visible instance may also be separately configurable. For example, the response to API calls received from an application routine that would result in a resource access operation to retrieve a piece of data (e.g., input from an input device, etc.) may be configurable to provide the application routine with a preselected indication of a value (e.g., a zero value or a "null" value). Also for example, the response to API calls received from an application routine that would result in a resource access operation to provide a piece of data to a resource (e.g., data to be visually presented on a display) may be configurable to store that data in a buffer to be provided to that resource when the instance becomes visible again.

Compared to other approaches to virtualization, the instantiation of multiple instances of a framework routine and the additional recurring handshake to inquire as to the status of visible or invisible requires considerably less additional utilization of the limited processing and storage resources of typical portable devices. Further, the need to design or modify application routines and device drivers specifically to provide virtualization is averted. As a result, virtualization to allow a portable device to be used by a single user for both personal and business-related tasks while maintaining each in a high degree of isolation from another is made more easily achievable.

Also made more easily achievable is virtualization to allow a portable device to be shared by multiple users while maintaining a high degree of isolation between the uses that each makes of the portable device. Indeed, in some embodiments, actions taken when the kernel responds to the visibility check call with an indication of an instance of the framework routine being visible (rather than invisible) may also be configurable such that a visible instance may be prevented from sharing a resource that invisible instances may be share. This may be deemed desirable to configure an instance for use by a particular user (e.g., a child) in a manner that renders it incapable of using a particular resource (e.g., networking).

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will be apparent from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 is a block diagram of an embodiment of a virtualization system 1000 incorporating one or both of computing devices 100 and 500. Each of these computing devices 100 and 500 may be any of a variety of types of computing device, including without limitation, a desktop computer system, a data entry terminal, a laptop computer, a netbook computer, a tablet computer, a handheld personal data assistant, a smartphone, a digital camera, a body-worn computing device incorporated into clothing, a computing device integrated into a vehicle (e.g., a car, a bicycle, a wheelchair, etc.), a server, a cluster of servers, a server farm, etc.

As depicted, subsets of these computing devices 100 and 500 may exchange signals associated with the supporting the concurrent execution of multiple application routines in separate virtual environments in the computing device 500 via a network 999. However, one or more of these computing devices may exchange other data entirely unrelated to supporting such virtualization with each other and/or with still other computing devices (not shown) via the network 999. In various embodiments, the network 999 may be a single network possibly limited to extending within a single building or other relatively limited area, a combination of connected networks possibly extending a considerable distance, and/or may include the Internet. Thus, the network 999 may be based on any of a variety (or combination) of communications technologies by which signals may be exchanged, including without limitation, wired technologies employing electrically and/or optically conductive cabling, and wireless technologies employing infrared, radio frequency or other forms of wireless transmission.

In various embodiments, the computing device 500 incorporates one or more of a processor component 550, a storage 560, controls 520, an audio subsystem 522, a display 580, a camera 582 and an interface 590 to couple the computing device 500 to the network 999. The storage 560 stores one or more of a kernel routine 510, device drivers 512, a framework routine 540, framework configuration data 534, application routines 570a-c and application data 537a-c. Each of the kernel routine 510, the device drivers 512, the framework routine 540 and the application routines 570a-c incorporates a sequence of instructions operative on the processor component 550 in its role as a main processor component of the computing device 500 to implement logic to perform various functions.

At least the kernel routine 510 and the framework routine 540, together and supported by the device drivers 512, provide a core of an operating system that cooperates with the processor component 550 to provide a form of virtualization of that operating system to support the isolated execution of each of the application routines 570a-c and the selective sharing of resources among them. The device drivers 512 enable use by the operating system and the application routines 570a-c of one or more of the controls 520, the audio subsystem 522, the display 580, the camera 582 and the interface 590. Each of the application routines 570a-c may be any of a variety of types of application, including and not limited to, word processors, spreadsheet editors, CAD/CAM software, website browsers, audio/visual recording and/or playback software, photograph editors, etc. Each of the application data 537a-c may be any of a variety of types of data generated and/or used by the application routines 570a-c, respectively, including and not limited to, text, documents, photographs, audio, motion video, graphical images, databases, etc.

In executing the kernel routine 510 and the framework routine 540, the processor component 550 defines portions of the storage 560 at which to locate containers 567a-c within which each of the application routines 570a-c, respectively, are separately disposed for execution by the processor component 550. Within each of the containers 567a-c, the corresponding ones of the application routines 570a-c are able to access there own application data 537a-c, respectively, but are prevented from accessing either routines or data within any of the other containers 567a-c. In generating the containers 567a-c, the processor component 550 generates multiple instances of the framework routine 540 on which each of the containers 567a-c is separately based. Each of the instances of the framework routine 540 provides a layer of abstraction between the application routines 570a-c and at least the kernel routine 510. In generating the instances of the framework routine 540, the processor component 550 may configure each of the instances of the framework routine 540 to respond either similarly or in different ways to receiving API calls from their associated ones of the application routines 570a-c at times when they are not visible.

Figure 2:
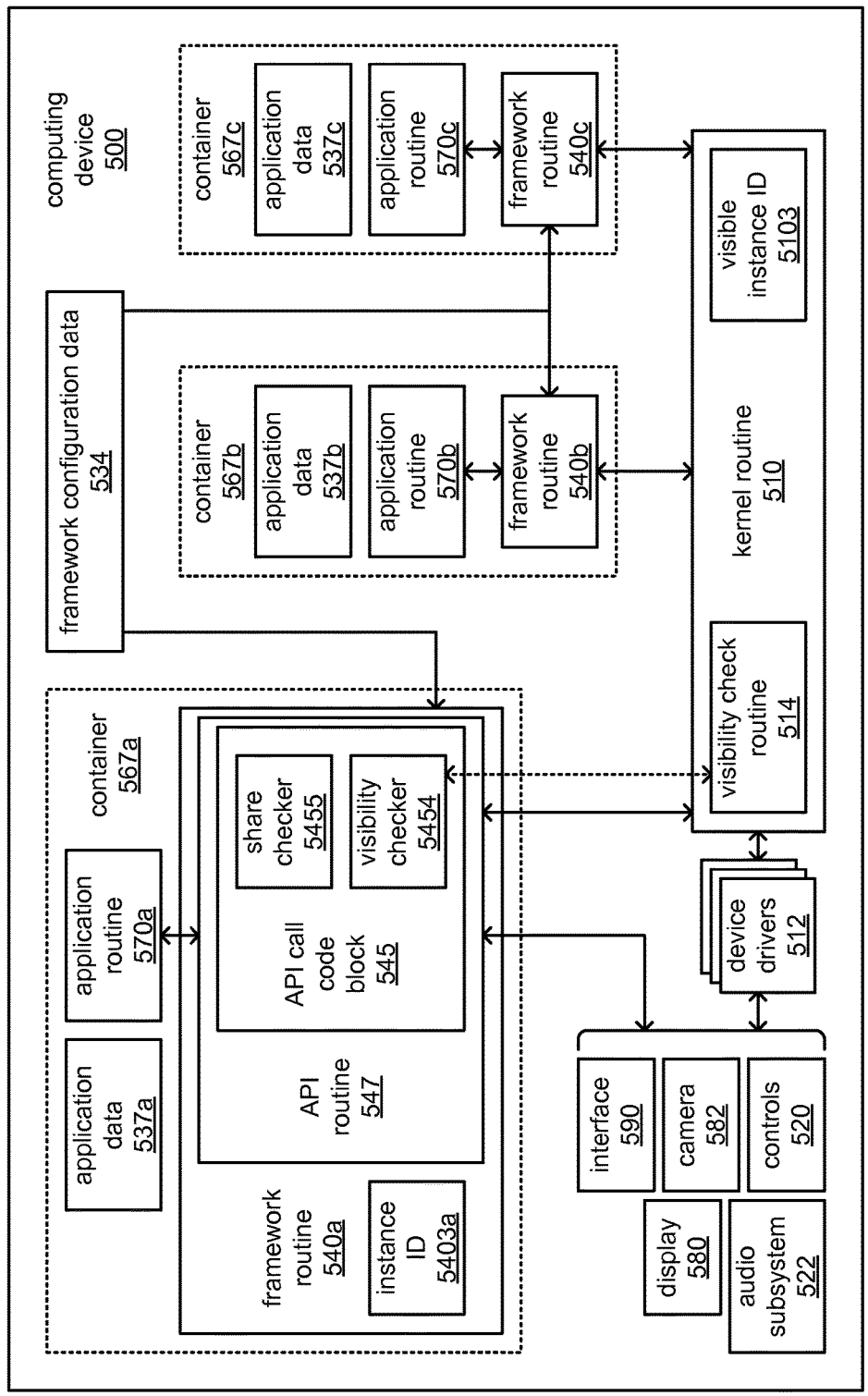
FIG. 2 illustrates an example of generating instances of a framework routine according to an embodiment.

FIG. 2 depicts an embodiment of generating multiple example instances of the framework routine 540, specifically the framework routines 540a-c. Each of the framework routines 540a-c defines a corresponding one of the containers 567a-c in which a corresponding one of the application routines 570a-c is executed in isolation from the others. FIG. 2 also depicts an example of interaction among the application routine 570a, the framework routine 540a, the kernel routine 510 and various resources in greater detail as an example of possible interactions among all of the application routines 570a-c, corresponding ones of the framework routines 540a-c, the kernel routine 510 and various resources.

As previously discussed, each of the framework routines 540a-c provides a layer of abstraction between corresponding ones of the application routines 570a-c and at least the kernel routine 510. More precisely, each of the framework routines 540a-c provides a corresponding one of the application routines 570a-c an API made up multiple API functions that are callable from each of the application routines 570a-c with corresponding API calls. This API provided by each of the framework routines 540a-c is separate and distinct from the system interface provided by the kernel routine 510 to each of the framework routines 540a-c. This system interface is made up of multiple system functions that are callable from each of the framework routines 540a-c with corresponding system calls. The framework routines 540a-c may each also provide a layer of abstraction between corresponding ones of the application routines 570a-c and various resources such as hardware components of the computing device 500. Such hardware components may include one or more of the controls 520, the audio subsystem 522, the display 580, the camera 582 and the interface 590. More precisely, the interface provided for the application routines 570a-c by the API may separate the application routines 570a-c from direct I/O and/or memory read and/or write operations that may be directly made to one or more of such hardware components by the framework routines 540a-c.

As depicted, the framework routine 540a incorporates an API routine 547 made up of multiple blocks of code implementing multiple API functions that are callable with API calls by the application routine 570a. For sake of discussion, FIG. 2 more specifically depicts an example of only one of those code blocks within the API routine 547, specifically an API call code block 545 that incorporates a sequence of instructions to implement an API function. Among the sequence of instructions is a visibility checker 5454 to check whether the framework routine 540a is currently visible and a share checker 5455 to determine what action to take if the framework routine 540a is not currently visible. Depending on processor instruction sets and/or choice of programming language each of the visibility checker 5454 and the share checker 5455 may be implemented as one or more distinct instructions of the sequence of instructions of the API call code block 545, or as a portion of a conditional branch instruction. Corresponding to the visibility checker 5454, the kernel routine 510 incorporates a visibility check routine 514 that incorporates a sequence of instructions to provide a response indicative of whether an instance of the framework routine 540 that calls the visibility check routine 514 (e.g., the framework routine 540*a*) is currently visible or not.

During execution of the application routine 570*a* by the processor component 550, the application routine 570*a* makes an API call to framework routine 540*a*, specifying the API function implemented by the sequence of instructions of the API call code block 545, thereby causing that sequence of instructions to be executed by the processor component 550. Stated differently, a flow of execution by the processor component 550 "jumps" from the application routine 570*a* to the API call code block 545. The API call code block 545 may include code to implement one or more resource access operations (not shown) to be performed as part of the execution of the sequence of instructions of the API call code block 545 to perform the API function called for by the application routine 570*a*. In effect, those resource access operations are to be performed on behalf of the application routine 570*a*. As previously discussed, such resource access operations may each be a system call to the kernel routine 510 or a read or write operation directly to a hardware component.

However, before the one or more resource access operations on behalf of the application routine 570*a* are made, the visibility checker 5454 makes a visibility check call to the visibility check routine 514 of the kernel routine 510 to request an indication of whether the framework routine 540*a* is currently visible. During the generation of each instance of the framework routine 540, specifically the generation of each of the framework routines 540*a-c*, each such instance is provided a unique instance identifier (ID). Thus, as depicted, the framework routine 540*a* was provided with an instance ID 5403*a*. The kernel routine 510 maintains an indication of which of the framework routines 540*a-c* is the one instance of the framework routine 540 that is visible as a visible instance ID 5103.

The visibility check routine 514 incorporates a sequence of instructions that checks at least the visible instance ID 5103 to determine which of the framework routines 540*a-c* is the visible one, and the visibility check call received from the visibility checker 5454 causes execution of that sequence of instructions (e.g., a flow of execution jumps to the visibility check routine 514). In some embodiments, the visibility check routine 514 may compare an indication of which one of the framework routines 540*a-c* made the visibility check call 5454 to the indication of which one of the framework routines 540*a-c* that is indicated as being the currently visible one by the visible instance ID 5103. In such embodiments, the visibility check routine 514 may return a Boolean or other type of value that indicates simply whether the calling one of the framework routines 540*a-c* is the visible one. In other embodiments, the visibility check routine 514 may simply relay an indication to the calling one of the framework routines 540*a-c* of the instance ID of whichever one of the framework routines 540*a-c* is indicated by the visible instance ID 5103 as being the visible one. Regardless of the exact manner in which the visibility check routine 514 provides a response to the query made in the visibility checker 5454, the flow of execution returns to the sequence of instructions of the API call code block 545.

If the indication received by the API call code block 545 from the visibility check routine 514 is to the effect that the framework routine 540*a* is currently visible, then the one or more resource access operations of the API call code block 545 that are to be performed on behalf of the application routine 570*a* are allowed to be performed. However, if the indication received by the API call code block 545 from the visibility check routine 514 is to the effect that the framework routine 540*a* is not currently visible, then the one or more resource access operations of the API call code block 545 may or may not be allowed to be performed. Whether or not the one or more resource access operations are allowed to be performed may be determined by the results of the share checker 5455 determining what indication has been provided to the API routine 547 of what actions are or are not to be taken in response to the framework routine 540*a* not currently being visible.

In some embodiments, what actions are to be taken by the API call code block 545 in response to the indication that the framework routine 540*a* is not currently visible and in response to being called by the application routine 570*a* may be configurable by one or more indications of what action(s) to take or not take stored in the framework configuration data 534. The share checker 5455 may retrieve such indications directly from the framework configuration data 534 or from data separately maintained by the framework routine 540*a* generated from the framework configuration data 534. Such indications from the framework configuration data 534 may be provided to each of the framework routines 540*a-c* as each is generated. Such indications may specify the same action(s) to take or to not take by all of the instances of the API call code block 545 in one or more of the framework routines 540*a-c*, despite what may be a very wide range of different API functions performed by each of those instances of the API call code block 545.

In some embodiments, the API call code block 545 may be configured to respond to the framework routine 540*a* not currently being visible and to being called by the application routine 570*a* by simply returning the flow of execution back to the application routine 570*a* without performing the one or more resource access operations. Alternatively or additionally, where the API function entails providing data back to the application routine 570*a*, the API call code block 545 may be configured to provide a "null" value, a zero value, or other "empty" value back to the application routine 570*a* as the response. Alternatively or additionally, where the API function entails providing data to a resource, the API call code block may be configured to store that data in a buffer (not shown) to enable its provision to that resource at a later time when the framework routine 540*a* is once again the visible instance.

However, it should be noted that as previously discussed, the framework configuration data 534 may additionally include indications of what action(s) the API call code block 545 may or may not take in response to the framework routine 540*a* being visible (as opposed to invisible) and to being called by the application routine 570*a*. Again, this may be done to render the framework routine 540*a* incapable of accessing a particular resource while visible.

It should be noted that the sequence of instructions of the API call code block 545 may be organized to dispose whatever instructions that implement the visibility checker 5454 and the share checker 5455 towards the beginning of that sequence of instructions to ensure they are executed relatively early as a result of the API call code block 545 being called. This may be deemed desirable to optimize execution of the sequence of instructions to avoid unnecessary execution of instructions in situations where the checks made by the visibility checker 5454 and the share checker 5455 ultimately result in the API function of the API call code block 545 not being performed. For example, in some embodiments, the sequence of instructions of the API call code block 545 may include instructions to implement a converter to convert the format of data to be provided to a resource from one format to another. As familiar to those skilled in the art, such conversions of data formats can be processing and/or storage intensive, and it may be deemed wasteful to allow the sequence of instructions to perform such a conversion before performing checks of visibility and of what actions are to be taken, since the result may be that the now converted data is not allowed to be provided to a resource for which it was intended.

Figure 3:
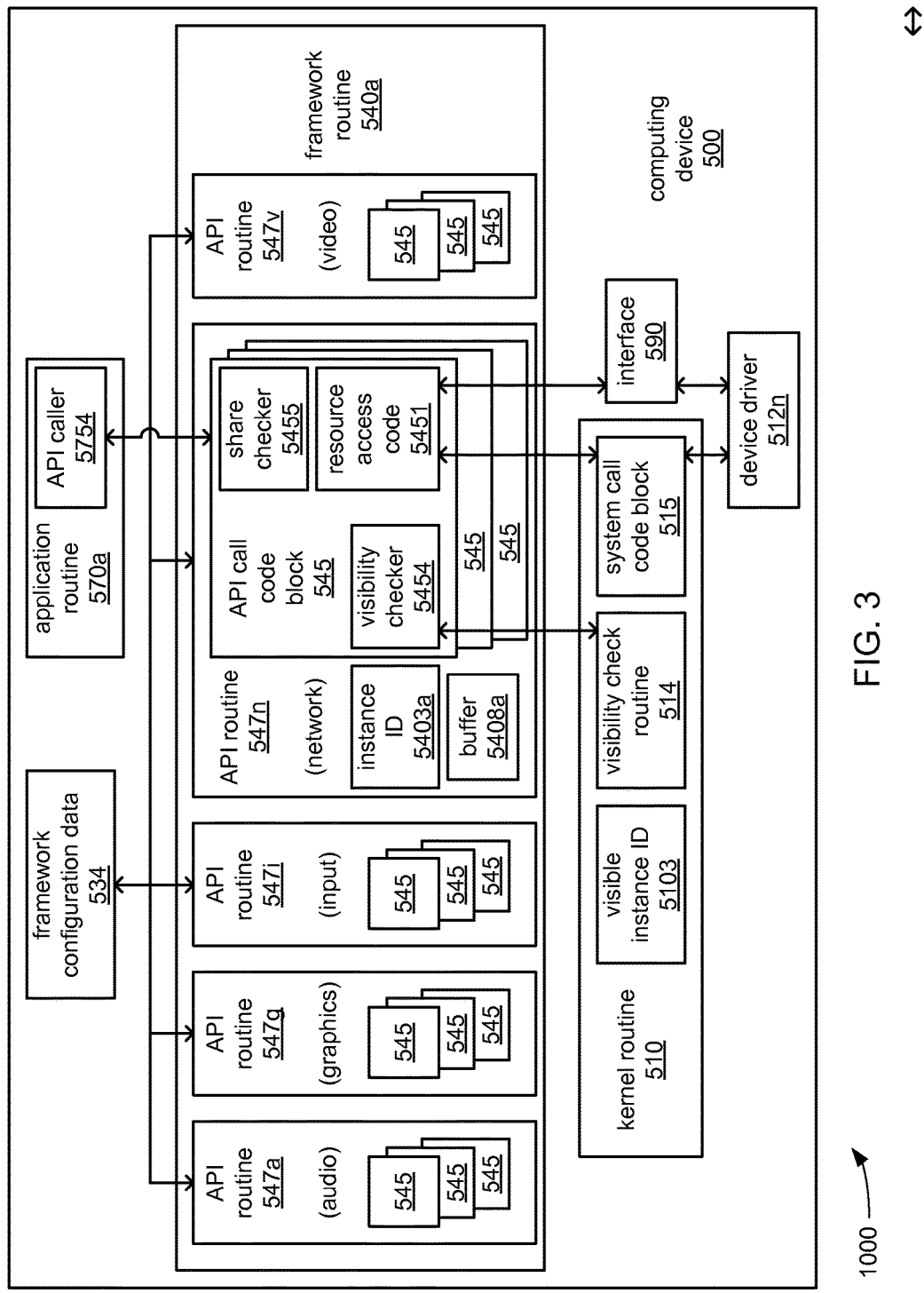
FIG. 3 illustrates an example of controlling use of system calls according to an embodiment.

FIG. 3 depicts an embodiment of controlling use of system calls in an example instance of the framework routine 540, specifically the framework routine 540a. FIG. 3 depicts the example of FIG. 2 of interaction among the application routine 570a, the framework routine 540a and the kernel routine 510 in greater detail. As previously discussed, each of the framework routines 540a-c provides a corresponding one of the application routines 570a-c an API made up multiple API functions that are callable from each of the application routines 570a-c with corresponding API calls. The API may be divisible into sets of API functions based on any of a variety of categorizations. One such division may be into API functions associated with specific resources such as specific ones of the hardware components that may include, and is not limited to, one or more of the controls 520, audio subsystem 522, display 580, camera 582 and interface 590.

FIG. 3 depicts an example of such a division of the API functions provided by the framework routine 540a to the application routine 570a into API functions for audio, graphics output, input from a user of the computing device 500, network interfacing, and video output other than graphics. As part of effecting this division, the framework routine 540a may incorporate multiple specialized instances of the API routine 547, specifically API routines 547a for audio, 547g for graphics, 547i for input, 547n for networking and 547v for video. In this example, the API routine 547a may support audio input and output functions using microphones and/or speakers of the audio subsystem 522. The API routine 547g may support the generation and visual presentation of graphical images on the display 580. The API routine 547i may support the receipt of user input via the controls 520. The API routine 547n may support networking functionality via the interface 590 coupling the computing device 500 to the network 999. The API 547v may support the capture and/or playback of motion video using the camera 582 and the display 580.

As more clearly depicted in FIG. 3, each of these instances of the API routine 547 may incorporate multiple ones of the API call code block 545, each of which is made up of a sequence of instructions to perform a different API function. However, it is a single one of the API call code blocks 545 of the API routine 547n that is depicted in still greater detail than was presented in FIG. 2 for purposes of discussion. Adding to this more detailed presentation of FIG. 3, the application routine 570a is specifically depicted as incorporating an API caller 5754 employed to make an API call to this specifically depicted API call code block 545. Further adding to this more detailed presentation, the kernel routine 510 is specifically depicted as incorporating a system call code block 515 implementing a system function that may be called with a system call from the by resource access code 5451 of this specifically depicted API call code block 545.

During execution of the application routine 570a by the processor component 550, the API caller 5754 of the application routine 570a makes an API call to the framework routine 540a that specifies the API function implemented by the sequence of instructions of the API call code block 545, thereby causing execution of that sequence of instructions. The API call code block 545 includes the resource access code 5451 to perform a resource access operation as part of performing the API function of the API call code block 545 that was called for by the application routine 570a in its API call.

However, before that resource access operation is performed, the visibility checker makes a visibility check call to the visibility check routine 514 to request an indication of whether the framework routine 540a is currently visible. Again, the visibility check routine 514 may refer to the visible instance ID 5103 in determining what instance of the framework routine 540 (e.g., one of the frame work routines 540a-c) is the visible one, and provides a response answering the query back to the API call code block 545.

If the indication received by the visibility checker 5454 of the API call code block 545 from the visibility check routine 514 is to the effect that the framework routine 540a is currently visible, then the resource access operation is allowed to be performed. As depicted, in this example, the resource to be accessed is the interface 590. As has been discussed, a resource access operation may be a system call to the kernel routine 510 or may be a direct I/O or memory read or write operation. Thus, as depicted, the resource access code 5451 may make a system call to the kernel routine 510 that specifies a system function performed by the system call code block 515. In turn, the system call code block 515 may access the interface 590 through a device driver, specifically a device driver 512n. Alternatively, as also depicted, the resource access code 5451 may directly access the interface 590 through a read or write operation to a portion of the interface addressable in an I/O or memory address space to the processor component 550.

Regardless of the exact manner in which the interface 590 is accessed in this resource access operation to operate it to send or receive a command or data as appropriate for whatever networking function was originally specified to be performed by the API caller 5754 in the API call it made to the framework routine 540a. By way of example, the interface 590 may be operated to retrieve at least a portion of the data 130 of the computing device 100 via the network 999 (referring momentarily back to FIG. 1).

However, if the indication received by the visibility checker 5454 of the API call code block 545 from the visibility check routine 514 is to the effect that the framework routine 540a is not currently visible, then the aforedescribed resource access call to access the interface 590 on behalf of the application routine 570a may or may not be allowed to be made. Again, what actions are taken or not taken may be configurable via the framework configuration data 534, and the API call code block 545 may determine what actions are to be taken or not taken through retrieval of an indication of that configuration by the share checker 5455. Again, the API call code block 545 may simply return flow of execution back to the application routine 540a. Alternatively or additionally, the API call code block 545 may provide a "null" or other value back to the application routine 540a and/or buffer data to be provided to the resource (in this case, the interface 590), depending on the nature of the API function specified in the API call made by the API caller 5754 and/or depending on what actions the API call code block 545 is configured to take or not take.

What action is taken or not taken by any of the API call code blocks 545 of any of the API routines 547a, 547g, 547i, 547*n* or 547*v* in response to the indication that the framework routine 540*a* is not currently visible (and in response to being called in an API call) may be individually configurable by indications in the framework configuration data 534 and/or by another mechanism. Such indications could be provided to individual ones of the API call code blocks 545 and/or may be provided to sets of AP call code blocks 545, such as the sets separately making up each of the API routines 547*a*, 547*g*, 547*i*, 547*n* and 547*v*. By specifying actions to take or to not take separately for each of these instantiations of the API routine 547, control may be exercised over what resources (e.g., what hardware components) of the computing device 500 are shared or not shared by the one of the framework routines 540*a-c* that is visible with one or more of the ones of the framework routines 540*a-c* that are invisible.

Figure 4:
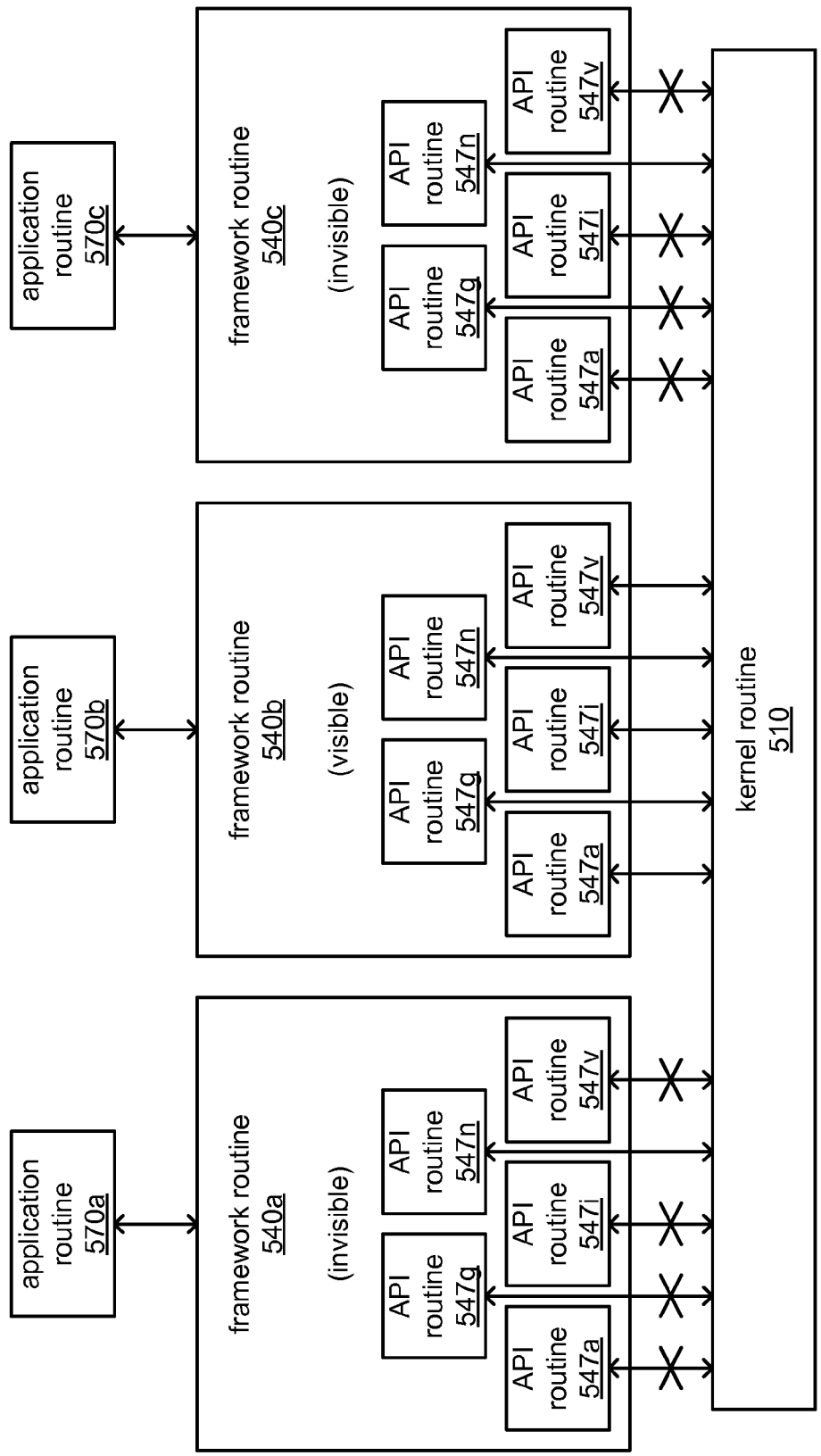
FIG. 4 illustrates an example of controlling sharing of resources according to an embodiment.

FIG. 4 depicts an example of such use of configuration of responses to each of the framework routines 540*a-c* not being the visible one at various times to control sharing of resources. At least at one moment depicted in FIG. 4, the framework routine 540*b* is visible and the framework routines 540*a* and 540*c* are invisible.

Just as in the example of FIG. 3, each of the framework routines 540*a-c* depicted in FIG. 4 incorporate the same API routines 547*a*, 547*g*, 547*i*, 547*n* and 547*v*. In this example, each of the framework routines 540*a-c* have been provided with indications that none of the API call code blocks 545 of the API routines 547*a*, 547*g*, 547*i* and 547*v* are to be allowed to perform resource access operations when the one of the framework routines 540*a-c* into which they are incorporated is invisible. However, the framework routines 540*a-c* have also been provided with indications that the API call code blocks 545 of the API routine 547*n* are to continue to be allowed to perform resource access operations regardless of whether the one of the framework routines 540*a-c* into which they are incorporated is visible or invisible.

As a result of this configuration, the fact of the framework routines 540*a* and 540*c* being currently invisible (as depicted) results in none of the API call code blocks 545 of their API routines 547*a*, 547*g*, 547*i* and 547*v* being allowed to perform resource access operations to perform API functions called for in API calls received from the application routines 570*a* and 570*c*, respectively. Further, despite the framework routines 540*a* and 540*c* being currently invisible, the API call code blocks of the API routine 547*n* in each of the API routine 547*n* of each continue to be allowed to perform resource access operations. Also as a result of this configuration, the fact of the framework routine 540*b* being currently visible (as also depicted) results in all of the API call code blocks 545 of all of the API routines 547*a*, 547*g*, 547*i*, 547*n* and 547*v* being allowed to perform resource access operations to perform API functions called for in API calls received from the application routine 570*b*.

This results in resource access operations associated with networking via the interface 590 continuing to be performed by all three of the framework routines 540*a-c*, regardless of which one is currently visible. Effectively, networking functionality via the interface 590 is effectively shared among the all three of these instances of the framework routine 540, regardless of their status as visible or invisible. However, this also results in resource access operations associated with audio, graphics, input and video being performed only by the one of the framework routines 540*a-c* that is currently visible (e.g., the framework routine 540*b*, as depicted). Effectively, audio functionality via the audio subsystem 522, graphics and video functionality via the display 580, input functionality via the controls 520 and video functionality via the camera 582 are not shared, but are allowed to be employed only by the one of the framework routines 540*a-c* that is currently visible (again, the framework routine 540*b*, as depicted).

In various embodiments, each of the processor component 550 may include any of a wide variety of commercially available processors. Further, this processor component may include multiple processors, a multi-threaded processor, a multi-core processor (whether the multiple cores coexist on the same or separate dies), and/or a multi-processor architecture of some other variety by which multiple physically separate processors are in some way linked.

In various embodiments, the storage 560 may be based on any of a wide variety of information storage technologies, possibly including volatile technologies requiring the uninterrupted provision of electric power, and possibly including technologies entailing the use of machine-readable storage media that may or may not be removable. Thus, this storage may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although this storage is depicted as a single block, one or more of these may include multiple storage devices that may be based on differing storage technologies. Thus, for example, this depicted storage may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that this storage may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, the interface 590 may employ any of a wide variety of signaling technologies enabling computing devices to be coupled to other devices as has been described. Each of these interfaces may include circuitry providing at least some of the requisite functionality to enable such coupling. However, this interface may also be at least partially implemented with sequences of instructions executed by corresponding ones of the processor components (e.g., to implement a protocol stack or other features). Where electrically and/or optically conductive cabling is employed, this interface may employ signaling and/or protocols conforming to any of a variety of industry standards, including without limitation, RS-232C, RS-422, USB, Ethernet (IEEE-802.3) or IEEE-1394. Where the use of wireless signal transmission is entailed, this interface may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 5:
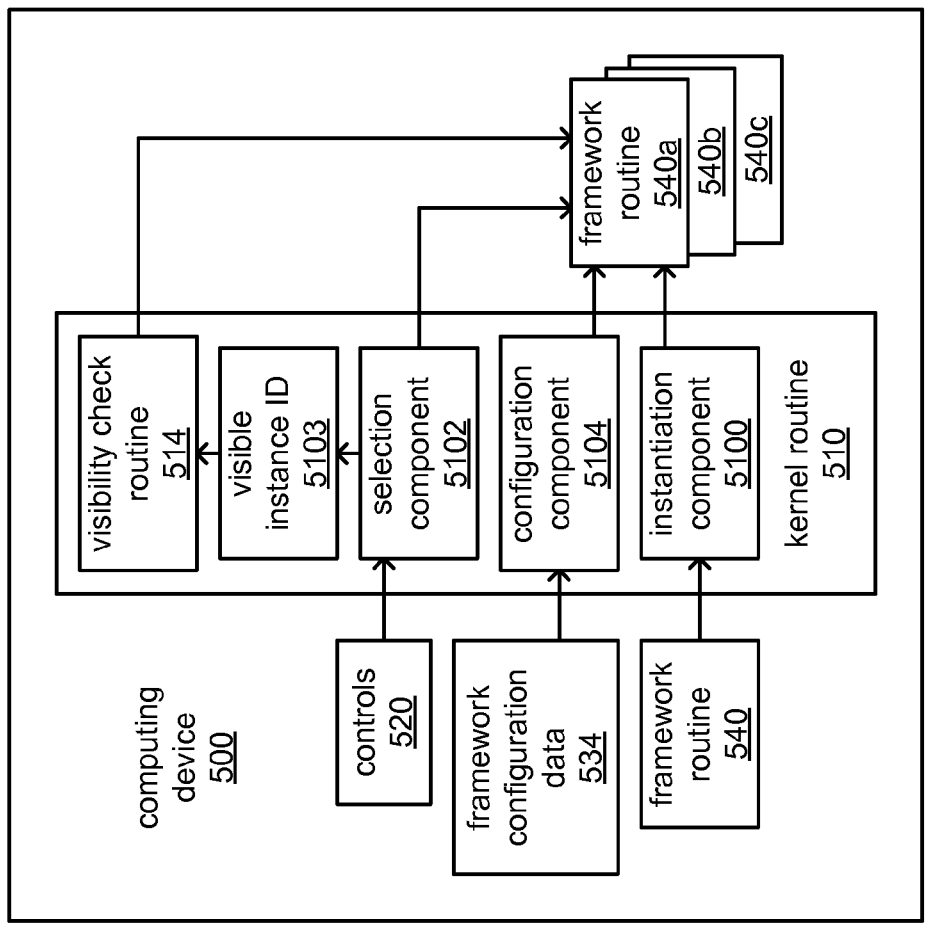
FIGS. 5-6 each illustrate a portion of an embodiment of a virtualization system.
Figure 6:
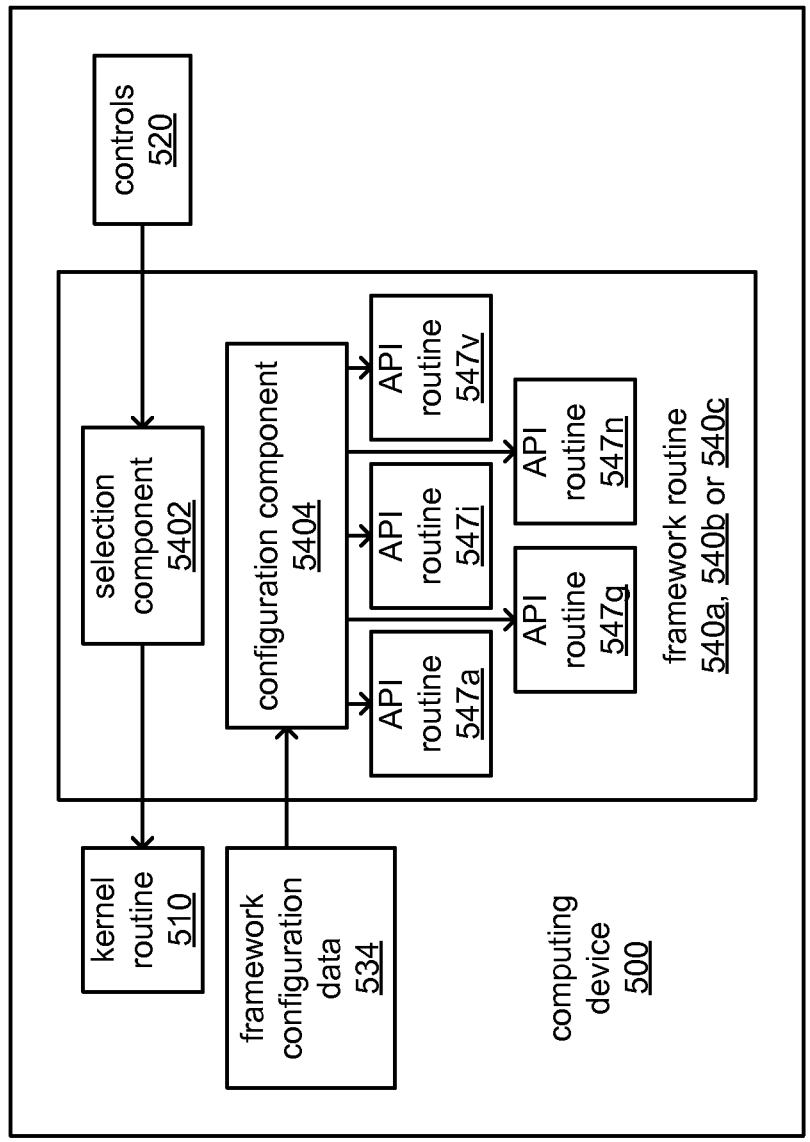

FIGS. 5 and 6 each illustrate a block diagram of a portion of an embodiment of the virtualization system 1000 of FIG. 1 in greater detail. More specifically, FIG. 5 depicts aspects of the operating environment of the computing device 500 in which the processor component 550, in executing the kernel routine 510, generates multiple instances of the framework routine 540 (e.g., the framework routines 540a-c, as depicted). FIG. 6 depicts aspects of the operating environment of the computing device 500 in which the processor component 550, in executing an instance of the framework routine 540 (e.g., one of the framework routines 540a, 540b or 540c, as depicted), configures blocks of code implementing API functions in one or more API routines (e.g., the API routines 547a, 547g, 547i, 547n and/or 547v, as depicted).

As recognizable to those skilled in the art, the kernel routine 510 and generated instances of the framework routine 540, including the components of which each is composed, are selected to be operative on whatever type of processor or processors that are selected to implement the processor component 550. In various embodiments, the sequences of instructions making up each may include one or more of at least a portion of an operating system, device drivers and/or application-level routines (e.g., so-called "software suites" provided on disc media, "applets" obtained from a remote server, etc.). Where at least a portion of an operating system is included, the operating system may be any of a variety of available operating systems appropriate for the processor component 550. Where one or more device drivers are included, those device drivers may provide support for any of a variety of other components, whether hardware or software components, of the computing device 500.

Turning more specifically to FIG. 5, the kernel routine 510 may include an instantiation component 5100 executable by the processor component 550 to generate multiple instances of the framework routine 540 (e.g., the framework routines 540a-c, as depicted). As previously discussed, the generation of instances of the framework routine 540 is part of defining containers in which application routines (e.g., the application routines 570a-c) may be separately executed in a manner isolating them from each other. As also previously discussed, the instance of the framework routine 540 generated to correspond with each of the containers provides a layer of abstraction between its associated one of the application routines and both the kernel routine and various resources (e.g., hardware components). API calls are made to each of the instances of the framework routine by its associated one of the application routines, and in turn, either system calls are made to the kernel routine 510 to indirectly access a resource, or read or write operations are performed to directly access a resource.

The kernel routine 510 may include a configuration component 5104 executable by the processor component 550 to retrieve indications of the actions to be taken by blocks of code implementing API functions (e.g., instances of the API call code block 545) in one or more of the framework routines 540a-c during times when they are currently invisible. As has been explained, such indications may apply the same response to being invisible to all of such blocks of code in each instance of the framework routine 540, or may apply different responses to different sets of such blocks of code (e.g., sets of blocks of code that belong to different API routines associated with different features or hardware components), or may apply different responses to individual ones of the blocks of code. Further, different ones of multiple instantiations of the framework routine 540 may be configured different such that corresponding blocks of such code take different actions in different instances in response to being invisible.

The kernel routine 510 may include a selection component 5102 executable by the processor component 550 to change which of multiple instances of the framework routine 540 (e.g., which of the framework routines 540a-c) is the one that is currently visible. As depicted, the selection component 5102 may receive an indication from the controls 520 of the controls 520 having been operated to convey a command to change which of the instances is the currently visible one. In embodiments in which the controls 520 includes a keypad or keyboard, the operation to provide such an indication may include the depressing of a particular key or combination of keys. In embodiments in which the controls 520 is a touch element of a touchscreen (e.g., a touchscreen in which the display 580 is the display element), the operation to provide such an indication may be a specific pattern of touching the touch-sensitive surface of such a touch element (e.g., a combination of fingertips pressing at particular locations or a particular "swiping" movement with one or more fingertips). Other forms of operation of other possible forms of the controls 520 will occur to those skilled in the art.

Turning more specifically to FIG. 6, an instance of the framework routine 540 (e.g., one of the framework routines 540a-c) may include a configuration component 5404 executable by the processor component 550 to retrieve indications of the actions to be taken by blocks of code implementing API functions (e.g., instances of the API call code block 545) in one or more of the framework routines 540a-c during times when they are currently invisible. Again, such configuration may be per block of code, per set of such blocks of code, or with a single configuration applied to all of such blocks of code.

An instance of the framework routine 540 (e.g., one of the framework routines 540a-c) may include a selection component 5402 executable by the processor component 550 to relay an indication from the controls 520 to the kernel routine 510 to change which of multiple instances of the framework routine 540 (e.g., which of the framework routines 540a-c) is the one that is currently visible. As depicted, the selection component 5402 may receive an indication from the controls 520 of the controls 520 having been operated to convey a command to change which of the instances is the currently visible one. Again, the operation of the controls 520 that conveys such a command may taken any of a variety forms.

Figure 7:
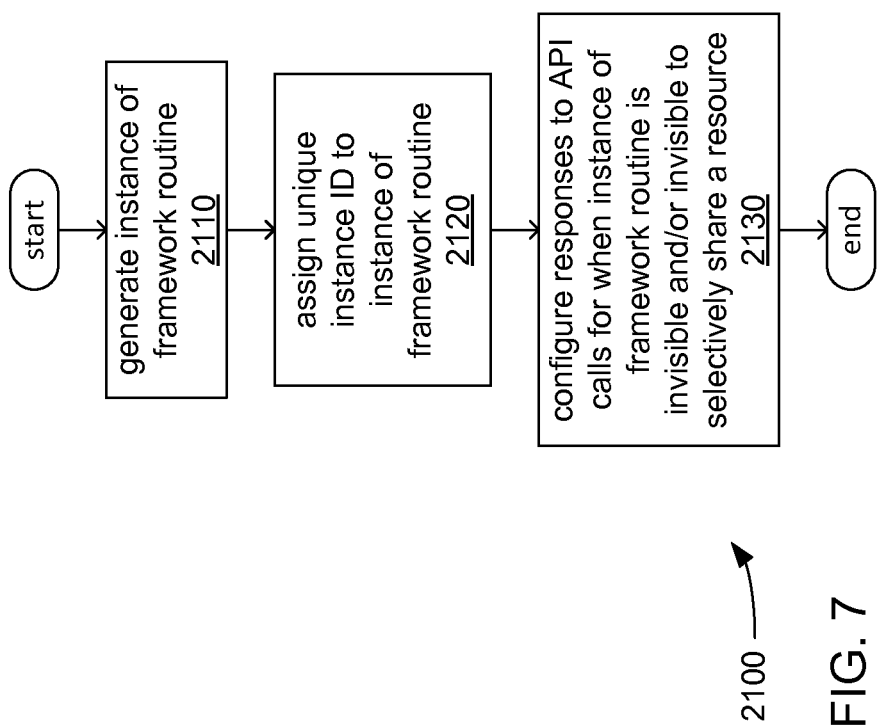
FIGS. 7-10 each illustrate a logic flow according to an embodiment.

FIG. 7 illustrates one embodiment of a logic flow 2100. The logic flow 2100 may be representative of some or all of the operations executed by one or more embodiments described herein. More specifically, the logic flow 2100 may illustrate operations performed by the processor component 550 in executing at least the kernel routine 510 and/or an instance of the framework routine 540, and/or performed by other component(s) of the computing device 500.

At 2110, a processor component of a computing device of a virtualization system (e.g., the processor component 550 of the computing device 500 of the virtualization system 1000) generates an instance of a framework routine (e.g., an instance of the framework routine 540, such as one of the framework routines 540a-c). As previously discussed, the generation of instances of the framework routine 540 is part of defining containers (e.g., one or more of the containers 567a-c) in which application routines (e.g., one or more of the application routines 570a-c) may be separately executed in a manner isolating them from each other.

At 2120, a unique instance ID (e.g., the instance ID 5403a) is assigned to the generated instance of the framework routine. As has been discussed, the instance IDs of multiple instances of the framework routine 540 may be employed in determining whether a given instance is the visible instance and/or in identifying which instance is the visible instance.

At 2130, responses of the instance of the framework routine to API calls are configured for times when the instance is visible and/or not visible instance. As has been discussed, in some embodiments, actions to take or not take in response to being called via an API call and in response to receiving an indication of currently being invisible may be configurable. Further, such configuration may include actions to take or not take in response to being called via an API call and in response to receiving an indication of currently being visible (as opposed to being invisible). As has also been discussed, this may be done as part of configuring which resources of the computing device are to be shared among the one instance that is visible and the others that are invisible, and which resources of the computing device are not to be shared such that only the one instance that is visible uses those resources.

Figure 8:
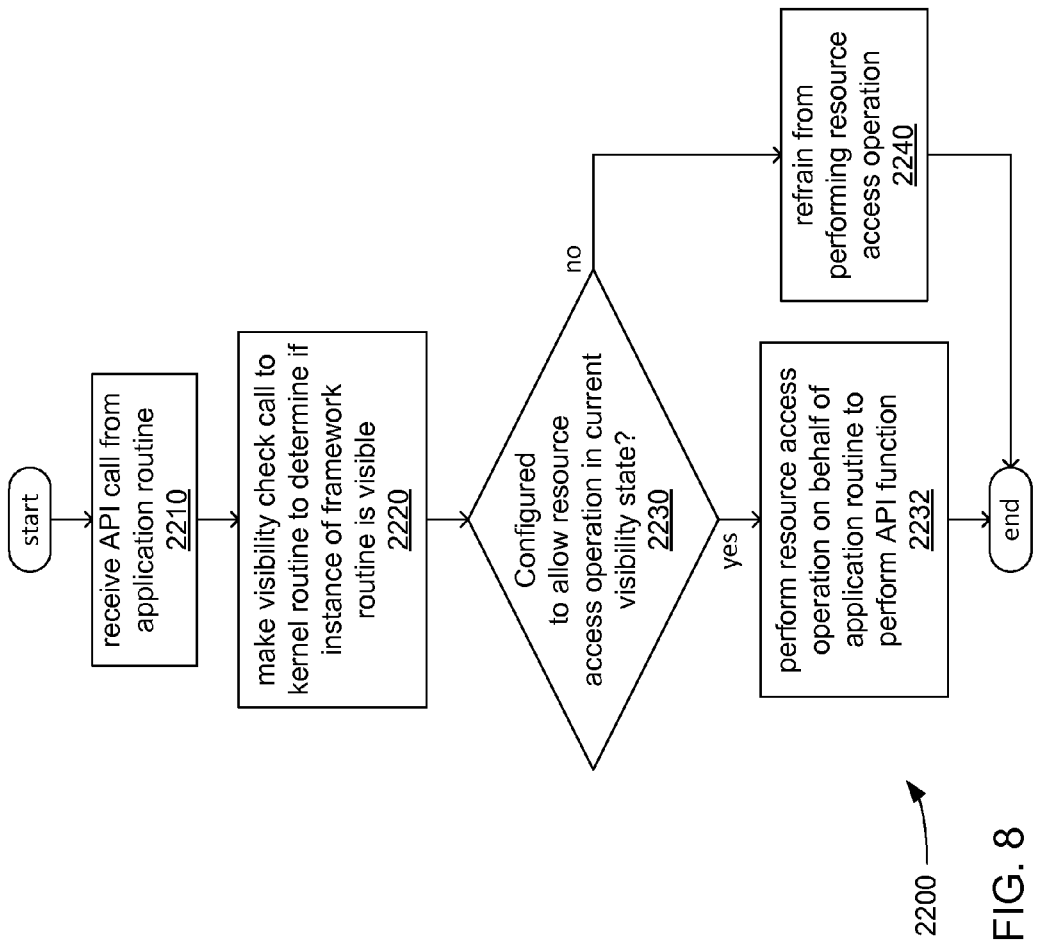

FIG. 8 illustrates one embodiment of a logic flow 2200. The logic flow 2200 may be representative of some or all of the operations executed by one or more embodiments described herein. More specifically, the logic flow 2200 may illustrate operations performed by the processor component 550 in executing at least an instance of the framework routine 540, and/or performed by other component(s) of the computing device 500.

At 2210, a processor component of a computing device of a virtualization system (e.g., the processor component 550 of the computing device 500 of the virtualization system 1000) receives (as it executes an instance of a framework routine) an API call from an application routine (e.g., one of the application routines 570a-c). As previously discussed, each instance of the framework routine 540 (e.g., one of the framework routines 540a-c) provides a layer of abstraction between an application routine and a kernel routine (e.g., the kernel routine 510).

At 2220, a block of code made up of a sequence of instructions to perform the API function called for in the received API call makes a visibility check call to the kernel routine to determine whether the instance of the framework routine is currently the visible instance. As has been discussed, the kernel routine may respond with a Boolean style response to the effect that the instance of the framework routine is or is not visible, or the kernel routine may respond with an identifier (e.g., an instance ID) of the instance that is visible.

At 2230, a check is made as to whether the block of code is allowed to perform a resource access operation in whichever state of visible or not visible that the instance is currently in. If the block of code is so allowed, then the block of code performs the resource access operation at 2232. If the block of code is not so allowed, then the block of code refrains from performing the resource access operation at 2240.

Figure 9:
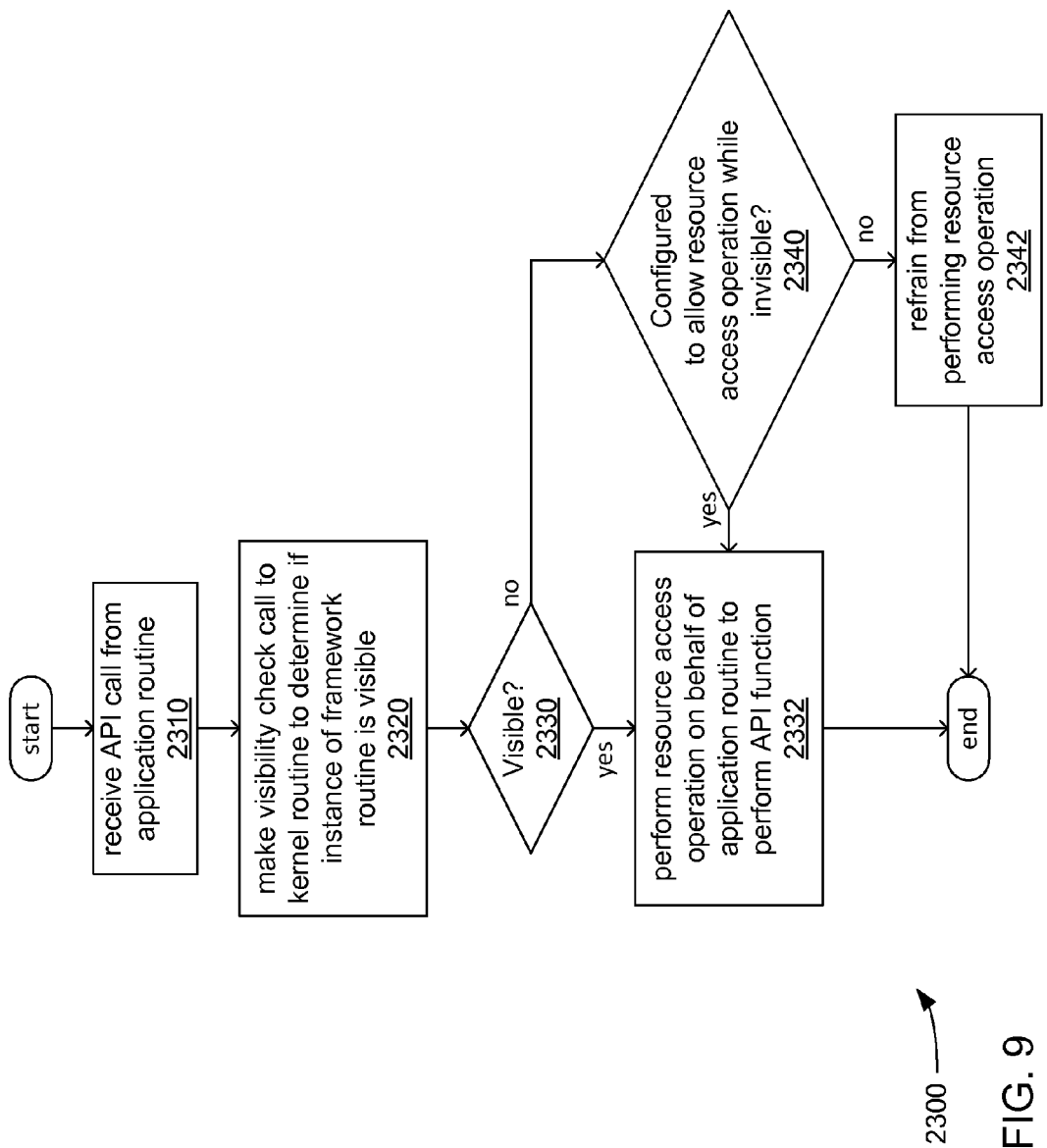

FIG. 9 illustrates one embodiment of a logic flow 2300. The logic flow 2300 may be representative of some or all of the operations executed by one or more embodiments described herein. More specifically, the logic flow 2300 may illustrate operations performed by the processor component 550 in executing at least an instance of the framework routine 540, and/or performed by other component(s) of the computing device 500.

At 2310, a processor component of a computing device of a virtualization system (e.g., the processor component 550 of the computing device 500 of the virtualization system 1000) receives (as it executes an instance of a framework routine) an API call from an application routine (e.g., one of the application routines 570a-c). Again, each instance of the framework routine 540 (e.g., one of the framework routines 540a-c) provides a layer of abstraction between an application routine and a kernel routine (e.g., the kernel routine 510).

At 2320, a block of code made up of a sequence of instructions to perform the API function called for in the received API call makes a visibility check call to the kernel routine to determine whether the instance of the framework routine is currently the visible instance. Again, the kernel routine may respond with a Boolean style response to the effect that the instance of the framework routine is or is not visible, or the kernel routine may respond with an identifier (e.g., an instance ID) of the instance that is visible.

If the instance of the framework routine is currently visible at 2330, then at 2332, the block of code is allowed to perform a resource access operation on behalf of the application routine as part of performing the API function called for in the API called received therefrom. However, if the instance is not currently visible at 2330, a check is made as to whether the instance has been configured to allow the block of code to still perform that resource access operation at times when the instance is not visible (e.g., is invisible).

If the instance of the framework routine is configured to allow that resource access operation to be performed at times when the instance is invisible at 2340, then that resource access operation is performed at 2332. However, if the framework routine is configured to not allow that resource access operation to be performed at times when the instance is invisible at 2340, then the block of code refrains from performing that resource access operation at 2342.

Figure 10:
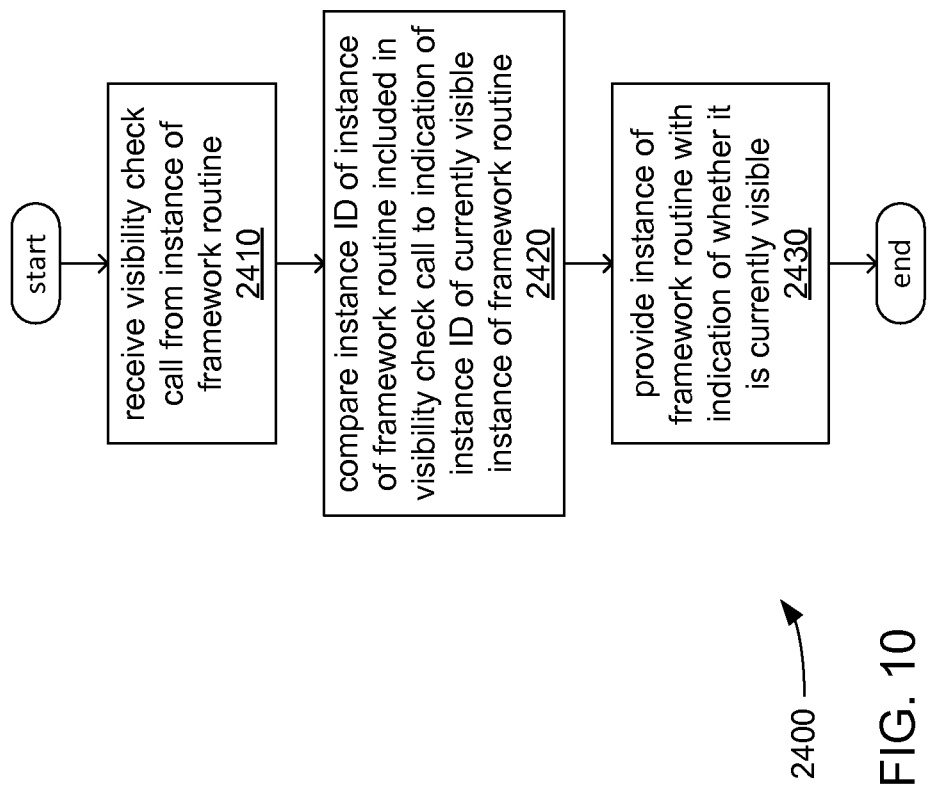

FIG. 10 illustrates one embodiment of a logic flow 2400. The logic flow 2400 may be representative of some or all of the operations executed by one or more embodiments described herein. More specifically, the logic flow 2400 may illustrate operations performed by the processor component 550 in executing at least the kernel routine 510, and/or performed by other component(s) of the computing device 500.

At 2410, a processor component of a computing device of a virtualization system (e.g., the processor component 550 of the computing device 500 of the virtualization system 1000) receives (as it executes a kernel routine) a visibility check call from an instance of a framework routine (e.g., one of the framework routines 540a-c). As previously discussed, the visibility check call may include an identifier of the instance of the framework routine that made it (e.g., an instance ID).

At 2420, the instance ID received in the visibility check call is compared to an indication of the instance ID of whichever one of multiple instances of the framework routine is currently the instance that is visible. However, as has also been discussed, the indication of the instance ID of the currently visible instance may simply be retrieved for being provided to the instance that made the visibility check call.

At 2430, an indication is provided to the instance of the framework routine that made the visibility check call as to whether it is the instance that is currently visible. As has been discussed, this may be a responses of the instance of the framework routine to API calls are configured for times when the instance is not the visible instance. As has been discussed, the response may be a Boolean style response to the effect that the instance of the framework routine that made the visibility check call is or is not visible. However, as has also been discussed, the response may be the instance ID of whatever instance currently is visible.

Figure 11:
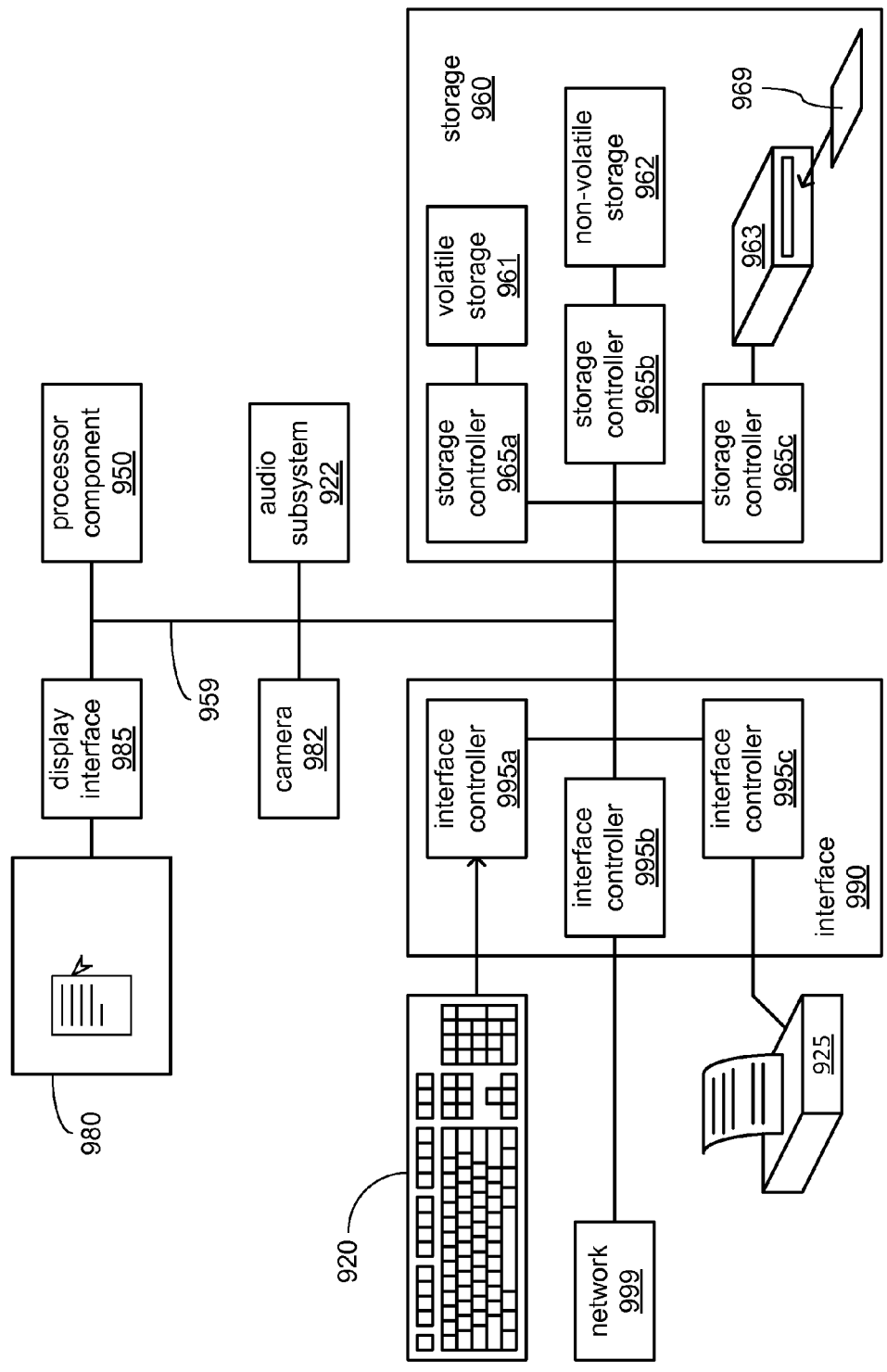
FIG. 11 illustrates a processing architecture according to an embodiment.

FIG. 11 illustrates an embodiment of a processing architecture 3000 suitable for implementing various embodiments as previously described. More specifically, the processing architecture 3000 (or variants thereof) may be implemented as part of one or more of the computing devices 100 or 500. It should be noted that components of the processing architecture 3000 are given reference numbers in which the last two digits correspond to the last two digits of reference numbers of at least some of the components earlier depicted and described as part of these computing devices. This is done as an aid to correlating components of each.

The processing architecture 3000 may include various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor component, the processor component itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the unidirectional or bi-directional exchange of information. For instance, the components may communicate information in the form of signals communicated over the communications media. The information can be implemented as signals allocated to one or more signal lines. A message (including a command, status, address or data message) may be one of such signals or may be a plurality of such signals, and may be transmitted either serially or substantially in parallel through any of a variety of connections and/or interfaces.

As depicted, in implementing the processing architecture 3000, a computing device may include at least a processor component 950, a storage 960, an interface 990 to one or more other devices, and a coupling 959. As will be explained, depending on various aspects of a computing device implementing the processing architecture 3000, including its intended use and/or conditions of use, such a computing device may further include additional components, such as without limitation, a display interface 985, a camera 982 and/or an audio subsystem 922. In whatever computing device may implement the processing architecture 3000, one of the various depicted components that are implemented with circuitry may be implemented with discrete components and/or as blocks of circuitry within a single or relatively small number of semiconductor devices (e.g., a "system on a chip" or SOC).

The coupling 959 may include one or more buses, point-to-point interconnects, transceivers, buffers, crosspoint switches, and/or other conductors and/or logic that communicatively couples at least the processor component 950 to the storage 960. Coupling 959 may further couple the processor component 950 to one or more of the interface 990, the audio subsystem 970 and the display interface 985 (depending on which of these and/or other components are also present). With the processor component 950 being so coupled by couplings 959, the processor component 950 is able to perform the various ones of the tasks described at length, above, for whichever one(s) of the aforedescribed computing devices implement the processing architecture 3000. Coupling 959 may be implemented with any of a variety of technologies or combinations of technologies by which signals are optically and/or electrically conveyed. Further, at least portions of couplings 959 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor component 950 (corresponding to the processor component 550) may include any of a wide variety of commercially available processors, employing any of a wide variety of technologies and implemented with one or more cores physically combined in any of a number of ways.

As previously discussed, the storage 960 (corresponding to the storage 560) may be made up of one or more distinct storage devices based on any of a wide variety of technologies or combinations of technologies. More specifically, as depicted, the storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as possibly including multiple distinct types of storage is in recognition of the commonplace use of more than one type of storage device in computing devices in which one type provides relatively rapid reading and writing capabilities enabling more rapid manipulation of data by the processor component 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 959 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 959 through a storage controller 965b providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of machine-readable storage medium 969, the removable media storage 963 may be communicatively coupled to coupling 959 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage medium 969.

One or the other of the volatile storage 961 or the non-volatile storage 962 may include an article of manufacture in the form of a machine-readable storage media on which a routine including a sequence of instructions executable by the processor component 950 to implement various embodiments may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a computing device at different times to store executable routines and/or data. Thus, a routine including a sequence of instructions to be executed by the processor component 950 to implement various embodiments may initially be stored on the machine-readable storage medium 969, and the removable media storage 963 may be subsequently employed in copying that routine to the non-volatile storage 962 for longer term storage not requiring the continuing presence of the machine-readable storage medium 969 and/or the volatile storage 961 to enable more rapid access by the processor component 950 as that routine is executed.

As previously discussed, the interface 990 (corresponding to the interface 590) may employ any of a variety of signaling technologies corresponding to any of a variety of communications technologies that may be employed to communicatively couple a computing device to one or more other devices. Again, one or both of various forms of wired or wireless signaling may be employed to enable the processor component 950 to interact with input/output devices (e.g., the depicted example keyboard 920 or printer 925) and/or other computing devices, possibly through a network (e.g., the network 999) or an interconnected set of networks. In recognition of the often greatly different character of multiple types of signaling and/or protocols that must often be supported by any one computing device, the interface 990 is depicted as including multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995b may employ any of a variety of cabling-based or wireless signaling, timings and/or protocols to access other computing devices through the depicted network 999 (perhaps a network made up of one or more links, smaller networks, or perhaps the Internet). The interface 995c may employ any of a variety of electrically conductive cabling enabling the use of either serial or parallel signal transmission to convey data to the depicted printer 925. Other examples of devices that may be communicatively coupled through one or more interface controllers of the interface 990 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data signaled by those persons via gestures and/or facial expressions, laser printers, inkjet printers, mechanical robots, milling machines, etc.

Where a computing device is communicatively coupled to (or perhaps, actually incorporates) a display (e.g., the depicted example display 980, corresponding to the display 580), such a computing device implementing the processing architecture 3000 may also include the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

More generally, the various elements of the computing devices described and depicted herein may include various hardware elements, software elements, or a combination of both. Examples of hardware elements may include devices, logic devices, components, processors, microprocessors, circuits, processor components, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

In Example 1, an apparatus to virtualize an operating system includes a processor component, a visibility checker for execution by the processor component to make a visibility check call to a kernel routine to request an indication of whether an instance of a framework routine that comprises the visibility checker is visible, and resource access code of the instance for execution by the processor component to perform a resource access operation to access a hardware component based on the indication and on receipt of an application programming interface (API) call from an application routine that specifies an API function to access the hardware component.

In Example 2, which includes the subject matter of Example 1, the apparatus may include the kernel routine, and the kernel routine may include a visibility check routine for execution by the processor component to compare a first identifier of which instance of multiple instances of the framework routine is a visible instance to a second identifier assigned to the instance and received in the visibility check call to determine whether the instance is visible, the indication comprising a Boolean value that indicates whether the instance is visible.

In Example 3, which includes the subject matter of any of Examples 1-2, the apparatus may include the kernel routine, and the kernel routine may include a visibility check routine for execution by the processor component to retrieve a first identifier of which instance of multiple instances of the framework routine is a visible instance, the indication comprising the first identifier, and the instance to compare the first identifier to a second identifier assigned to the instance to determine whether the instance is visible.

In Example 4, which includes the subject matter of any of Examples 1-3, the apparatus may include the hardware component, the hardware component communicatively coupled to the processor component, and the instance comprising a share checker for execution by the processor component to determine an action to take based on the indication and in response to receipt of the API call.

In Example 5, which includes the subject matter of any of Examples 1-4, the action may include performing the resource access operation to share the hardware component.

In Example 6, which includes the subject matter of any of Examples 1-5, the action may include at least one of returning flow of execution to the application routine without performing the resource access operation, providing a null value to the application routine, providing a zero value to the application routine, or buffering data specified in the API call to be provided to the hardware component to not share the hardware component.

In Example 7, which includes the subject matter of any of Examples 1-6, the apparatus may include a configuration component for execution by the processor component to configure the instance to take the action.

In Example 8, which includes the subject matter of any of Examples 1-7, the apparatus may include a device driver associated with the hardware component, the resource access operation comprising a system call to the kernel routine, the kernel routine to operate the hardware component through the device driver in response to the system call.

In Example 9, which includes the subject matter of any of Examples 1-8, the instance may include multiple API call code blocks, each API call code block for execution by the processor component to perform an API function, to make the visibility call check to the kernel routine and to take an action based on the indication and in response to receipt of the API call.

In Example 10, which includes the subject matter of any of Examples 1-9, the apparatus may include a configuration component for execution by the processor component to configure the action of each API call code block.

In Example 11, which includes the subject matter of any of Examples 1-10, the apparatus may include the hardware component, the hardware component communicatively coupled to the processor component, a subset of the multiple API call code blocks associated with the hardware component, and the configuration component to configure the action of each API call code block of the subset to selectively share the hardware component with another instance of the framework routine.

In Example 12, which includes the subject matter of any of Examples 1-11, the hardware component may include one of an interface to couple the processor component to a network, a display, a camera, an audio subsystem or controls enabling console input.

In Example 13, an apparatus to virtualize an operating system may include a processor component; an instance of a framework routine for execution by the processor component to make a visibility check call to a kernel component to request an indication of whether the instance is visible, and to take an action based on the indication and on receipt of an application programming interface (API) call from an application routine that specifies an API function to access the hardware component; and a configuration component for execution by the processor component to configure the action to selectively share the hardware component with another instance of the framework routine, the hardware component communicatively coupled to the processor component.

In Example 14, which includes the subject matter of Example 13, the configuration component may configure the action in each instance of multiple instances of the framework routine to selectively share the hardware component, the multiple instances comprising the instance and the other instance.

In Example 15, which includes the subject matter of any of Examples 13-14, the apparatus may include the hardware component, the hardware component comprising one of an interface to couple the processor component to a network, a display, a camera, an audio subsystem or controls enabling console input.

In Example 16, which includes the subject matter of any of Examples 13-15, the instance may include a share checker for execution by the processor component to determine the action for which the instance is configured in response to receipt of the API call and the instance indicated in the indication as not visible.

In Example 17, which includes the subject matter of any of Examples 13-16, the action may include making a system call to the kernel routine to share the hardware component.

In Example 18, which includes the subject matter of any of Examples 13-17, the action may include at least one of returning flow of execution to the application routine without making a system call to the kernel routine, providing a null value to the application routine, providing a zero value to the application routine, or buffering data specified in the API call to be provided to the kernel routine to not share the hardware component.

In Example 19, a computing-implemented method for virtualizing an operating system includes making a visibility check call to a kernel routine to request an indication of whether an instance of a framework routine is visible, and performing a resource access operation to access a hardware component of a computing device based on the indication and on receipt of an application programming interface (API) call from an application routine that specifies an API function to access the hardware component.

In Example 20, which includes the subject matter of Example 19, the method may include taking an action to not share the hardware component with another instance of the framework routine based on the indication and in response to receipt of the API call, the action comprising at least one of returning flow of execution to the application routine without performing the resource access operation, providing a null value to the application routine, providing a zero value to the application routine, or buffering data specified in the API call to be provided to the hardware component.

In Example 21, which includes the subject matter of any of Examples 19-20, the method may include taking an action to share the hardware component with another instance of the framework routine based on the indication and in response to receipt of the API call, the action comprising at least one of making a system call to the kernel routine, directly accessing the hardware component in a read operation or directly accessing the hardware component in a write operation.

In Example 22, which includes the subject matter of any of Examples 19-21, the method may include determining an action to take in response to receipt of the API call and based on the indication.

In Example 23, which includes the subject matter of any of Examples 19-22, the method may include generating multiple instances of the framework routine, the multiple instances comprising the instance, and configuring the action in each instance of the multiple instances to selectively share the hardware component.

In Example 24, which includes the subject matter of any of Examples 19-23, the method may include performing the resource access operation in response to receipt of the API call and the instance indicated as visible in the indication to share the hardware component, and refraining from performing another resource access operation in response to receipt of another API call and the instance indicated as visible in the indication to not share another hardware component, the other API call associated with the other hardware component.

In Example 25, which includes the subject matter of any of Examples 19-24, the method may include receiving a Boolean value indicating whether the instance is visible in response to the visibility check call.

In Example 26, which includes the subject matter of any of Examples 19-25, the method may include comprising comparing a first identifier specifying which instance of multiple instances of the framework routine is a visible instance to a second identifier assigned to the instance to determine whether the instance is visible.

In Example 27, which includes the subject matter of any of Examples 19-26, the hardware component may include one of an interface to a network, a display, a camera, an audio subsystem or controls enabling console input.

In Example 28, at least one machine-readable storage medium includes instructions that when executed by a processor component, cause the processor component to make a visibility check call to a kernel routine to request an indication of whether an instance of a framework routine is visible, and perform a resource access operation to access a hardware component communicatively coupled to the processor component based on the indication and on receipt of an application programming interface (API) call from an application routine that specifies an API function to access the hardware component.

In Example 29, which includes the subject matter of Example 28, the processor component may be caused to take an action to not share the hardware component with another instance of the framework routine based on the indication and in response to receipt of the API call, the action comprising at least one of returning flow of execution to the application routine without performing the resource access operation, providing a null value to the application routine, providing a zero value to the application routine, or buffering data specified in the API call to be provided to the hardware component.

In Example 30, which includes the subject matter of any of Examples 28-29, the processor component may be caused to take an action to share the hardware component with another instance of the framework routine based on the indication and in response to receipt of the API call, the action comprising at least one of making a system call to the kernel routine to indirectly access the hardware component, directly accessing the hardware component in a read operation or directly accessing the hardware component in a write operation.

In Example 31, which includes the subject matter of any of Examples 28-30, the processor component may be caused to determine an action to take in response to receipt of the API call and based on the indication.

In Example 32, which includes the subject matter of any of Examples 28-31, the processor component may be caused to generate multiple instances of the framework routine, the multiple instances comprising the instance, and configure the action in each instance of the multiple instances to selectively share the hardware component.

In Example 33, which includes the subject matter of any of Examples 28-32, the processor component may be caused to perform the resource access operation in response to receipt of the API call and the instance indicated as visible in the indication to share the hardware component; and refrain from performing another resource access operation in response to receipt of another API call and the instance indicated as visible in the indication to not share another hardware component, the other API call associated with the other hardware component.

In Example 34, which includes the subject matter of any of Examples 28-33, the processor component may be caused to receive a Boolean value indicating whether the instance is visible in response to the visibility check call.

In Example 35, which includes the subject matter of any of Examples 28-34, the processor component may be caused to compare a first identifier specifying which instance of multiple instances of the framework routine is a visible instance to a second identifier assigned to the instance to determine whether the instance is visible.

In Example 36, which includes the subject matter of any of Examples 28-35, the hardware component may include one of an interface to couple the processor component to a network, a display, a camera, an audio subsystem or controls enabling console input.

In Example 37, an apparatus to virtualize an operating system includes means for making a visibility check call to a kernel routine to request an indication of whether an instance of a framework routine is visible, and performing a resource access operation to access a hardware component based on the indication and on receipt of an application programming interface (API) call from an application routine that specifies an API function to access the hardware component.

In Example 38, which includes the subject matter of Example 37, the apparatus may include means for taking an action to not share the hardware component with another instance of the framework routine based on the indication and in response to receipt of the API call, the action comprising at least one of returning flow of execution to the application routine without performing the resource access operation, providing a null value to the application routine, providing a zero value to the application routine, or buffering data specified in the API call to be provided to the hardware component.

In Example 39, which includes the subject matter of any of Examples 37-38, the apparatus may include means for taking an action to share the hardware component with another instance of the framework routine based on the indication and in response to receipt of the API call, the action comprising at least one of making a system call to the kernel routine, directly accessing the hardware component in a read operation or directly accessing the hardware component in a write operation.

In Example 40, which includes the subject matter of any of Examples 37-39, the apparatus may include means for determining an action to take in response to receipt of the API call and based on the indication.

In Example 41, which includes the subject matter of any of Examples 37-40, the apparatus may include means for generating multiple instances of the framework routine, the multiple instances comprising the instance, and configuring the action in each instance of the multiple instances to selectively share the hardware component.

In Example 42, which includes the subject matter of any of Examples 37-41, the apparatus may include means for performing the resource access operation in response to receipt of the API call and the instance indicated as visible in the indication to share the hardware component; and refraining from performing another resource access operation in response to receipt of another API call and the instance indicated as visible in the indication to not share another hardware component, the other API call associated with the other hardware component.

In Example 43, which includes the subject matter of any of Examples 37-42, the apparatus may include means for receiving a Boolean value indicating whether the instance is visible in response to the visibility check call.

In Example 44, which includes the subject matter of any of Examples 37-43, the apparatus may include means for comparing a first identifier specifying which instance of multiple instances of the framework routine is a visible instance to a second identifier assigned to the instance to determine whether the instance is visible.

In Example 45, which includes the subject matter of any of Examples 37-44, the apparatus may include the hardware component, and the hardware component may include one of an interface to a network, a display, a camera, an audio subsystem or controls enabling console input.

In Example 46, at least one machine-readable storage medium may include instructions that when executed by a computing device, cause the computing device to perform any of the above.

In Example 47, an apparatus to virtualize an operating system may include means for performing any of the above.

The invention claimed is:
1. An apparatus to virtualize an operating system comprising:
 a processor component;
 a memory comprising one or more containers that each make up a respective portion of the memory, wherein each container comprises elements including an application routine, an instance of a framework routine, and data stored in the respective portion of memory, wherein the framework routine further comprises a visibility checker, and wherein each application routine is prevented from accessing elements of other containers;

a kernel routine of the operating system that is external to the one or more containers and is executed by the processor component;

the instance of the framework routine of the respective container for execution by the processor component to receive an application programming interface (API) call from the application routine of the respective container that specifies an API function to use to access a hardware component;

the visibility checker of the respective container for execution by the processor component to make a visibility check call to the kernel routine to request an indication of whether the instance of the framework routine that executes in the respective container is visible, wherein the instance of the framework routine is allowed to perform a resource access operation to access the hardware component when the instance of the framework routine is visible and is not allowed to perform the resource access operation to access the hardware component when the instance of the framework routine is not visible; and upon determining, by the kernel routine, that the respective container is visible:

resource access code of the instance of the framework routine of the respective container for execution by the processor component to perform the resource access operation to access the hardware component using the specified API function.

2. The apparatus of claim 1, the kernel routine comprising a visibility check routine for execution by the processor component to compare a first identifier of which instance of multiple instances of the framework routine is a visible instance to a second identifier assigned to the instance and received in the visibility check call to determine whether the instance is the visible instance, the indication comprising a Boolean value that indicates whether the instance is the visible instance, the framework routine providing a layer of abstraction between the application routine in the respective container and the kernel routine.

3. The apparatus of claim 1, the kernel routine comprising a visibility check routine for execution by the processor component to retrieve a first identifier of which instance of multiple instances of the framework routine is a visible instance, the indication comprising the first identifier to identify which framework routine is the visible instance, and the instance of the framework routine to compare the first identifier to a second identifier assigned to the instance to determine whether the instance of the framework routine is the visible instance.

4. The apparatus of claim 1, comprising the hardware component, the hardware component communicatively coupled to the processor component, and the instance of the framework routine comprising a share checker for execution by the processor component to determine an action to take based on the indication and in response to receipt of the API call.

5. The apparatus of claim 4, the action comprising at least one of returning flow of execution to the application routine without performing the resource access operation, providing a null value to the application routine, providing a zero value to the application routine, or buffering data specified in the API call to be provided to the hardware component to not share the hardware component.

6. The apparatus of claim 4, comprising a device driver associated with the hardware component, the resource access operation comprising a system call to the kernel routine, the kernel routine to operate the hardware component through the device driver in response to the system call.

7. The apparatus of claim 1, the instance of the framework routine comprising multiple API call code blocks, each API call code block for execution by the processor component to perform an API function, to make the visibility call check to the kernel routine and to take an action based on the indication and in response to receipt of the API call.

8. The apparatus of claim 7, comprising a configuration component for execution by the processor component to configure the action of each API call code block, the action based on the indication and in response to receipt of the API call.

9. An apparatus to virtualize an operating system comprising:

a processor component;

a memory comprising one or more containers that each make up a respective portion of the memory, wherein each container comprises elements including an application routine, an instance of a framework routine, and data stored in the respective portion of memory, wherein the framework routine further comprises a visibility checker, and wherein each application routine is prevented from accessing elements of other containers;

a kernel routine of the operating system that is external to the one or more containers and is executed by the processor component;

the instance of the framework routine of the respective container for execution by the processor component to receive an application programming interface (API) call from the application routine of the respective container that specifies an API function to use to access a hardware component;

the visibility checker of the respective container for execution by the processor component to make a visibility check call to the kernel routine to request an indication of whether the instance of the framework routine that executes in the respective container is visible, and to take an action for a hardware component based on the indication wherein the instance of the framework routine is allowed to perform the action for the hardware component when the instance of the framework routine is visible and is not allowed to perform the action for the hardware component when the instance of the framework routine is not visible; and upon determining, by the kernel routine, that the respective container is visible: configure the action to selectively share the hardware component with another instance of the framework routine in another container.

10. The apparatus of claim 9, the configuration component to configure the action in each instance of multiple instances of the framework routine to selectively share the hardware component, the multiple instances comprising the instance and the another instance, the framework routine providing a layer of abstraction between the application routine in the respective container and the kernel routine.

11. The apparatus of claim 9, comprising the hardware component, the hardware component comprising one of an interface to couple the processor component to a network, a display, a camera, an audio subsystem or controls enabling console input.

12. The apparatus of claim 9, the instance of the framework routine comprising a share checker for execution by the processor component to determine the action for which the instance of the framework routine is configured in response to receipt of the API call and the instance indicated in the indication as not visible.

13. The apparatus of claim 12, the action comprising making a system call to the kernel routine to share the hardware component.

14. The apparatus of claim 12, the action comprising at least one of returning flow of execution to the application routine without making a system call to the kernel routine, providing a null value to the application routine, providing a zero value to the application routine, or buffering data specified in the API call to be provided to the kernel routine to not share the hardware component.

15. A computing-implemented method for virtualizing an operating system comprising:
  executing, on a processor, a kernel routine of the operating system, the kernel routine external to one or more containers in a memory, wherein each container makes up a respective portion of the memory, wherein each container comprises elements including an application routine, an instance of a framework routine, and data stored in the respective portion of memory, wherein the framework routine further comprises a visibility checker, wherein each application routine is prevented from accessing elements of other containers;
  receiving, by the instance of the framework routine of the respective container, an application programming interface (API) call from the application routine of the respective container that specifies an API function to use to access a hardware component;
  making, by the visibility checker of the respective container, a visibility check call to the kernel routine to request an indication of whether an instance of the framework routine executing in the respective container is visible, wherein the instance of the framework routine is allowed to perform a resource access operation to access the hardware component when the instance of the framework routine is visible and is not allowed to perform the resource access operation to access the hardware component when the instance of the framework routine is not visible; and
  upon determining, by the kernel routine, that the respective container is visible, performing the resource access operation to access the hardware component using the specified API function.

16. The computer-implemented method of claim 15, comprising taking an action to not share the hardware component with another instance of the framework routine based on the indication and in response to receipt of the API call, the action comprising at least one of returning flow of execution to the application routine without performing the resource access operation, providing a null value to the application routine, providing a zero value to the application routine, or buffering data specified in the API call to be provided to the hardware component.

17. The computer-implemented method of claim 15, comprising taking an action to share the hardware component with another instance of the framework routine based on the indication and in response to receipt of the API call, the action comprising at least one of making a system call to the kernel routine, directly accessing the hardware component in a read operation or directly accessing the hardware component in a write operation.

18. The computer-implemented method of claim 15, comprising determining an action to take in response to receipt of the API call and based on the indication.

19. The computer-implemented method of claim 18, comprising:
  generating multiple instances of the framework routine, the multiple instances comprising the instance; and
  configuring the action in each instance of the multiple instances to selectively share the hardware component, the framework routine providing a layer of abstraction between the application routine in the respective container and the kernel routine.

20. The computer-implemented method of claim 15, comprising:
  performing the resource access operation in response to receipt of the API call and the instance indicated as visible in the indication to share the hardware component; and
  refraining from performing another resource access operation in response to receipt of another API call and the instance indicated as visible in the indication to not share another hardware component, the other API call associated with the other hardware component.

21. At least one non-transitory machine-readable storage medium comprising instructions that when executed by a processor component, cause the processor component to:
  execute a kernel routine of the operating system, the kernel routine external to one or more containers in a memory, wherein each container makes up a respective portion of the memory, wherein each container comprises elements including an application routine, an instance of a framework routine, and data stored in the respective portion of memory, wherein the framework routine further comprises a visibility checker, wherein each application routine is prevented from accessing elements of other containers;
  receive, by the instance of the framework routine of the respective container, an application programming interface (API) call from the application routine of the respective container that specifies an API function to use to access a hardware component;
  make, by the visibility checker of the respective container, a visibility check call to the kernel routine to request an indication of whether an instance of the framework routine executing in the respective container is visible, wherein the instance of the framework routine is allowed to perform a resource access operation to access the hardware component when the instance of the framework routine is visible and is not allowed to perform the resource access operation to access the hardware component when the instance of the framework routine is not visible; and
  upon determining, by the kernel routine, that the respective container is visible, perform the resource access operation to access the hardware component using the specified API function.

22. The at least one non-transitory machine-readable storage medium of claim 21, the processor component caused to take an action to not share the hardware component with another instance of the framework routine based on the indication and in response to receipt of the API call, the action comprising at least one of returning flow of execution to the application routine without performing the resource access operation, providing a null value to the application routine, providing a zero value to the application routine, or buffering data specified in the API call to be provided to the hardware component, the another instance of the framework routine executing another container different than the container.

23. The at least one non-transitory machine-readable storage medium of claim 21, the processor component caused to take an action to share the hardware component with another instance of the framework routine based on the indication and in response to receipt of the API call, the action comprising at least one of making a system call to the kernel routine to indirectly access the hardware component, directly accessing the hardware component in a read operation or directly accessing the hardware component in a write operation.

24. The at least one non-transitory machine-readable storage medium of claim 21, the processor component caused to:
perform the resource access operation in response to receipt of the API call and the instance indicated as visible in the indication to share the hardware component; and
refrain from performing another resource access operation in response to receipt of another API call and the instance indicated as visible in the indication to not share another hardware component, the other API call associated with the other hardware component.

25. The at least one non-transitory machine-readable storage medium of claim 21, the hardware component comprising one of an interface to couple the processor component to a network, a display, a camera, an audio subsystem or controls enabling console input.

* * * * *